Sept. 25, 1962 W. L. MORRISON 3,055,760
METHOD OF PREPARING BACON
Filed Feb. 2, 1960
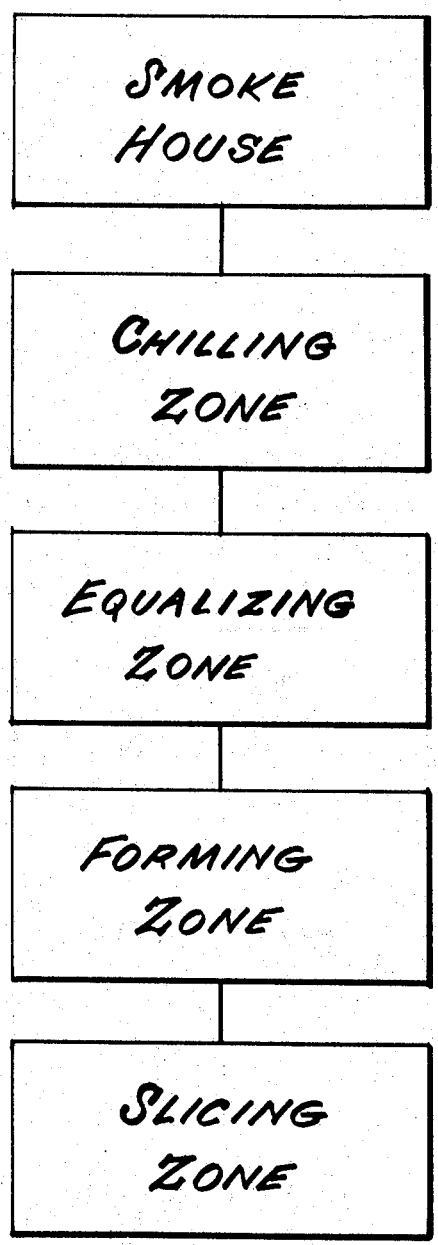
INVENTOR.
WILLARD L. MORRISON
BY PARKER & CARTER
ATTORNEYS

United States Patent Office 3,055,760
Patented Sept. 25, 1962

3,055,760
METHOD OF PREPARING BACON
Willard L. Morrison, Lake Forest, Ill., assignor to Liquefreeze Company, Inc., New York, N.Y., a corporation of New York
Filed Feb. 2, 1960, Ser. No. 6,130
1 Claim. (Cl. 99—194)

My invention relates to a method of treating bacon after it has been smoked and before the bacon is sliced.

When a side of bacon is removed from the hog in butchering, it does not have a generally uniform rectangular contour as is necessary for slicing and packaging.

In order to get the desired shape and texture, the bacon, after it leaves the smokehouse at a temperature in the order of 80–103 degrees F. has heretofore been chilled or cooled in a cold room, the temperature of which was far below the temperature of the bacon leaving the smokehouse and the bacon has been left in that room until the entire mass is at a temperature in the order of 26–28 degrees F., and has a waxy character, being no longer soft as it was as it came from the smokehouse. At this temperature, the bacon side is then compressed to rectangular shape and may thereafter be cut or otherwise treated.

This cooling of the bacon side in the smokehouse has heretofore taken from twenty-four to forty-eight hours. This ties up many pounds and many dollars worth of bacon waiting for the temperature to drop to a uniform 26–28 degrees F. temperature before the bacon can be shaped and cut. This time lag also makes it necessary to provide expensive room for storage and treatment of bacon, the cost of which can be largely reduced if the time of cooling can be reduced.

I propose as the bacon comes from the smokehouse at the relatively high temperature above referred to, to pour onto it or to immerse it in a bath of liquid nitrogen, at substantially atmospheric pressure. The liquid nitrogen will be at a temperature in the order of −320 degrees F. The bacon will be left in the bath for approximately four to six minutes until the outside of the slab or side is cooled far below the desired temperaure while the inside of the slab is still well above the desired temperature. The bacon is then withdrawn from the bath and the cold outside will chill the inside while itself warming up until after a suitable lapse of time depending on the weight of the side and the ambient temperature to which it is exposed. The temperature of the entire slab will equalize at 28 degrees F.

The tests have shown that approximately three and one-half liters of liquid nitrogen at atmospheric pressure must be vaporized to absorb the B.t.u.'s required to lower a ten pound side of bacon from 103 degrees to 28 degrees F. and since bringing the bacon side into intimate direct contact with the liquid nitrogen results in cooling some of the bacon far below 28 degrees F., it is obvious that the necessary amount of liquid nitrogen will be vaporized long before the entire mass has been cooled to 28 degrees F. because heat given up from the outer layers of the mass to vaporize the nitrogen results in an outer shell or layer far below the desired temperature. Then when the necessary volume or weight of liquid has been boiled or vaporized, to take away from the bacon mass the necessary B.t.u., the bacon can be removed from the bath and heat flow within the bacon itself will result in warming the super-cooled outer layers by heat transfer so that in a short time the entire side will have assumed a substantially uniform temperature, preferably 28 degrees F.

This treatment can be accomplished by placing, for instance ten pounds of bacon in a bath of three and one-half liters of liquid nitrogen. By the time the nitrogen has boiled or liquefied and none of the liquid is left, the necessary number of B.t.u. will have extracted from the bacon slab and the bacon may be left by internal heat flow to assume the desired temperature. On the other hand, the same result can be accomplished on a production line. Slabs of bacon from the smokehouse may be immersed in a liquid nitrogen bath and passed through the bath being allowed to remain therein for such a time that each slab will by the time it has passed through the bath have vaporized and have furnished the latent heat necessary to boil the amount of liquid nitrogen which must be boiled to lower the temperature to the desired point. As the slabs are taken from the bath, they will then be allowed to equalize in temperature before treatment.

I refer to liquid nitrogen as the coolant. It is, of course, quite obvious that any other cold boiling liquid, liquid oxygen or liquid air for example, may be used with equal success, provided the cold boiling liquid is a liquid which can be brought into direct contact with the bacon or with other foodstuffs being treated and will evaporate therefrom and will be evaporated thereby without causing any deterioration of the foodstuff and without changing in any way its taste characteristics.

I have used the term "ambient temperature" in specification and claim in a broad general sense as being the temperature to which the side of bacon is exposed when it leaves the liquid bath. It might be room temperature. It might be the temperature of the area immediately above the bath and ambient temperature is not therefore limited to the particular thermometer temperature of the climate in which the processing plant is located. It is the temperature to which the side of bacon itself is exposed after it leaves the bath.

While the nitrogen is a suitable cold boiling liquid, for my purpose and while I have the term "nitrogen" in the claim, I want it understood that any suitable cold boiling liquid which boils at very low temperatures at atmospheric pressure, for example, liquid air, liquid oxygen or other liquids may be used to bring about the same result and I have used the words "liquid nitrogen" and "nitrogen" merely in an illustrative sense, my claim being intended to be broad enough to cover any such cold boiling liquid.

This application is a continuation in part application of my co-pending application Serial No. 595,575, filed July 3, 1956, now abandoned.

My invention is illustrated diagrammatically in the accompanying drawing which discloses a flow sheet. The particular mechanisms used forming no part of the invention are not here illustrated. The flow sheet is as follows:

The bacon starts at the smokehouse where it is smoked in the usual way. It is taken from the smokehouse to the chilling zone. There it may be immersed in a bath until the desired weight of nitrogen has been evaporated or a pre-measured weight of nitrogen may be poured over the side of bacon. The bacon slab then goes to the equalizing zone where the temperature for convenience may be kept at 26 degrees F. which is the temperature finally to be obtained. When the bacon has been kept in that zone for the desired length of time or until the temperature by observation has shown to be uniform throughout, it then goes to the forming zone where it is formed by pressure in any suitable mold just as in past practice into a rectangular shape. From there it goes to the slicing zone where it is sliced just as in the past. From then on the treatment is conventional.

This differs radically from previous practice in that where in the past the bacon has been stored in a cold room, the temperature of the atmosphere in the cold room being relied upon to gradually lower the temperature of the bacon. In this case, the bacon instead of being gradually cooled is shock cooled down to the desired B.t.u. drop and the equalizing zone merely holds the bacon without additional cooling until it has equalized at the desired 26 degrees F.

The bacon slab is ordinarily treated in unwrapped condition, wrapping usually being applied after the bacon is sliced.

The convenient way in which my process can be carried out is as follows: The temperature of the bacon and its weight as it comes from the smokehouse is determined by scale and thermometer. The heat to be removed to lower the temperature of the known weight of bacon from smokehouse temperature to say 26–28 degrees F. can be calculated and stated in terms of British thermal units. The number of liters of liquid nitrogen at −320 degrees F. that will be vaporized by the known B.t.u.'s to be extracted from the heat makes it possible to determine how many liters of nitrogen must be used to cool a particular slab of bacon from smokehouse temperature to the treatment temperature, and when such amount of liquid nitrogen has been used up or vaporized, the desired number of B.t.u.'s will have been extracted from the bacon. Then all that is necessary is to leave the bacon in the predetermined atmosphere of ambient temperature, for example 26 degrees F. until the thermometers placed in the bacon show that the warm center has cooled and the cold outer shell has warmed until the entire mass is of uniform temperature.

The temperature as it comes from the smokehouse is known. The temperature to be reached is known. The weight of bacon is known. All these items are subject to easy determination. The amount of liquid nitrogen which must be evaporated can be determined by the following example:

Let us start with a temperature from the smokehouse of 100 degrees F., the end temperature to be 26 degrees F. The meat side is one and seven-eighths on the average by ten by twenty-four inches. That equals 450 cubic inches or 0.26 cubic foot. The specific gravity is .06. The specific heat of the bacon is 0.75, that is B.t.u.'s per pound per degree temperature change. If we multiply 0.26 cubic foot, the volume of the bacon, by 62.4 pounds per cubic feet times, .06 specific gravity, we have 10 pounds of bacon. We get the same result by weighing the bacon.

If we then multiply 10 pounds of bacon times 0.75 specific heat times 74 degrees, the temperature difference between 100 degrees smokehouse and 26 degrees the desired temperature, we get 565 B.t.u's, that means we must extract from that slab of bacon 565 B.t.u.'s to get its temperature to drop from 100 degrees F. to 26 degrees F. If we then divide 565 B.t.u. by 152 which is the B.t.u.'s necessary to vaporize one liter of nitrogen, we get 3.7 liters necessary to be vaporized to get the desired temperature drop. We multiply that by 1.7 pounds per liter and we then know that if that 10 pound slab of bacon vaporizes 6.6 pounds of liquid nitrogen from liquid at −320 degrees F. to gas at −320 degrees F., we will have taken out of the bacon the necessary number of British thermal units to lower the temperature from 100 to 26 degrees F.

Having extracted 565 British thermal units, we merely have to wait, storing the bacon in an ambient atmosphere of 26 degrees F., which is what we want, until heat flow within the bacon has equalized the temperature. Thermocouples will be inserted in different parts of the bacon so that direct reading can be made to show such equalization.

The rate at which the bacon temperature equalizes will be normally generally uniform but the texture of the bacon, the preparation and arrangement of fat and lean may cause slight changes. However, runs of bacon are generally on the average uniform so that once this determination has been made for a particular kind of bacon and the average time of equalization has been determined, from then on it is only necessary to determine the weight of the bacon, apply to that bacon the necessary weight of liquid nitrogen to produce the desired result.

I claim:

The method of preparing warm sides of bacon, as they come from the smokehouse, for shaping and processing which consists in immersing the warm unwrapped side at approximately 103 degrees F. in a bath of liquid nitrogen at atmospheric pressure, leaving the side in the bath until three and one-half liters of liquid nitrogen have been evaporated by the heat of each ten pounds of bacon and the outer layers of the slab have been chilled to a point far below 28 degrees F., then withdrawing the slab from the bath and subjecting it to ambient temperature until by heat transfer in the side, the temperature has become generally uniform at approximately 28 degrees F.

References Cited in the file of this patent
UNITED STATES PATENTS

| | | |
|---|---|---|
| 2,059,970 | Robillard | Nov. 3, 1936 |
| 2,119,716 | McKee | June 7, 1938 |
| 2,506,908 | Thompson | May 9, 1950 |
| 2,618,939 | Morrison | Nov. 25, 1952 |
| 2,937,097 | Draudt et al. | May 17, 1960 |